UNITED STATES PATENT OFFICE.

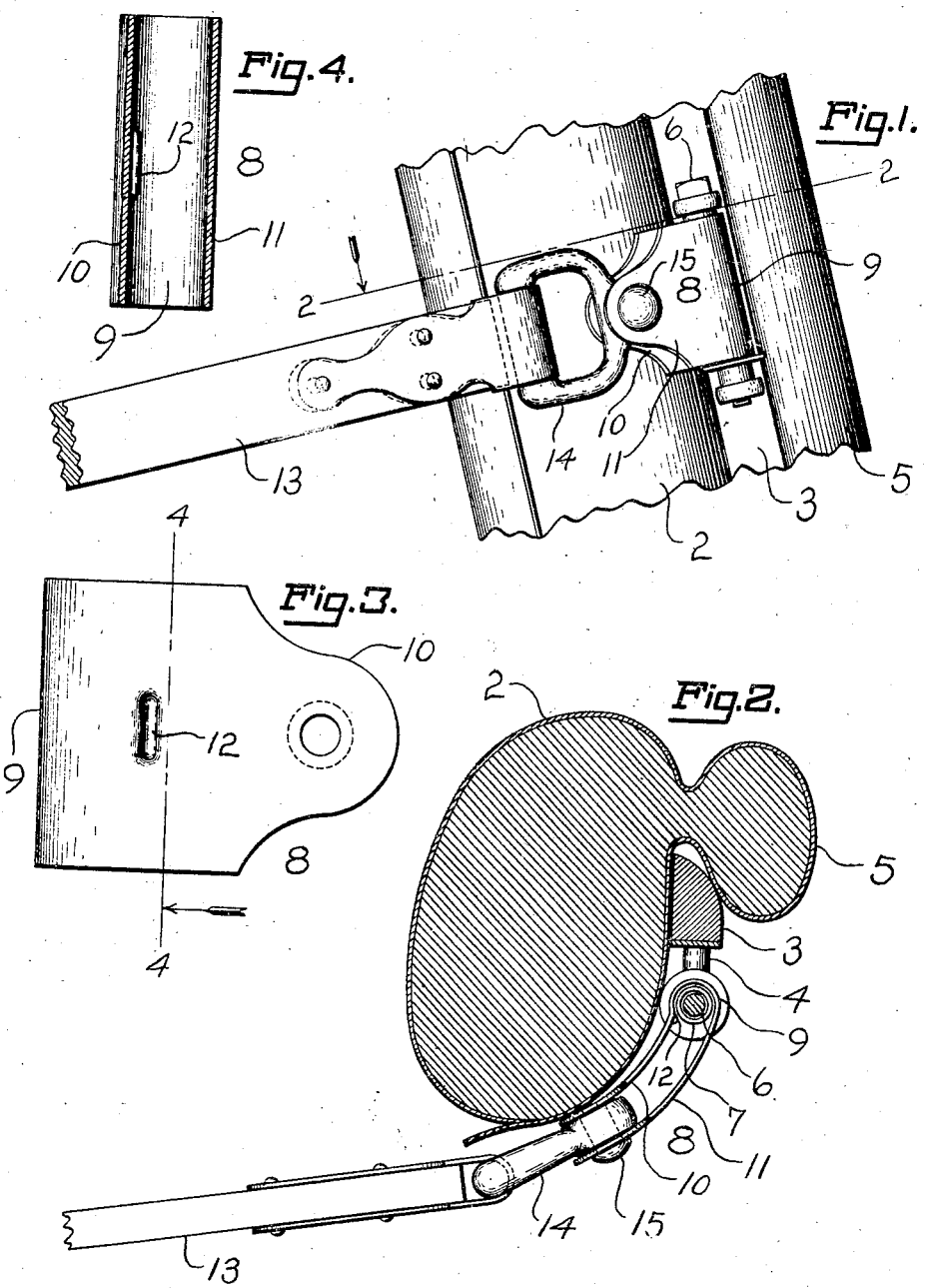

GEORGE W. TROOP, OF NEW BRITAIN, CONNECTICUT, ASSIGNOR TO THE NORTH & JUDD MANUFACTURING COMPANY, OF NEW BRITAIN, CONNECTICUT, A CORPORATION OF CONNECTICUT.

HAME-TUG CLIP.

1,189,886.

Specification of Letters Patent.

Patented July 4, 1916.

Application filed January 29, 1916. Serial No. 74,963.

*To all whom it may concern:*

Be it known that I, GEORGE W. TROOP, a subject of the King of Great Britain, residing at New Britain, in the county of Hartford and State of Connecticut, have invented certain new and useful Improvements in Hame-Tug Clips, of which the following is a specification.

This invention relates to what I shall for convenience term a "hame-tug clip," one of the primary objects of the invention being the provision of articles of this character which cannot chafe or injuriously rub against the collar.

Another object is to provide a clip which has means to prevent the D or other terminal of a trace or the like from shearing or cutting the collar.

A further object is the provision of means to prevent the roller of the bolt constituting a part of the hame, from slipping out of the bolt-receiving portion of the clip.

I will describe in detail that form of embodiment of the invention which I have selected for illustration in the drawings accompanying and forming part of the present specification. As may be gathered I do not restrict myself to this particular disclosure; I may depart therefrom in several respects within the scope of the invention defined by the claims following said description.

Referring to said drawings: Figure 1 is a side elevation of the draft portion of a collar and a hame-tug clip and its adjuncts associated therewith. Fig. 2 is a transverse section on the line 2—2 of Fig. 1, looking in the direction of the arrow. Fig. 3 is an inside face view of the clip, and, Fig. 4 is a vertical transverse section of said clip on the line 4—4 of Fig. 3 looking in the direction of the arrow.

Like characters refer to like parts throughout the several views.

In Fig. 1 I have shown the draft portion of a collar as 2, the collar in Fig. 2 being cut through practically the thick part which as is familiar to those skilled in the art constitutes the draft. The hame 3 is furnished with the starts 4 and is fitted in the seat between the draft and the roll 5. The starts are connected by the bolt 6, the roller 7 surrounding the bolt between the two starts.

The clip is denoted in a general way by 8. It comprises a body or bolt-receiving portion 9, and inner and outer jaws 10 and 11. The clip can conveniently be made of sheet metal doubled on itself to produce the article in question. The bolt-receiving portion in the present case is practically semi-circular in cross section, the roller 7 to which I have previously referred fitting comparatively freely within the semi-circular body from the sides of which the jaws 10 and 11 extend in a rearward and outward direction. While as a matter of preference both jaws are the same in construction, this may not in all cases be necessary. The free ends of the jaws, it will be perceived on reference to Fig. 2, are practically coincident with or slightly to the rear of a line extending approximately transversely of the draft of the collar 2, or as it might otherwise be stated, said free ends are located practically at the highest part of the draft of the collar, by virtue of which a tug or trace terminal which may be connected with said jaws or cheeks cannot in action shear the collar. In the present case the radius of the inner surface of the clip body 8 is a little greater than that of the roller 7, and as the said body is practically semi-circular in cross section, the roller can be readily slipped into the body by way of either open end thereof. I provide means of a simple nature to prevent the roller from slipping back, the projection 12 answering suitably in this connection. This projection consists as shown of part of the stock of the clip pressed or indented inwardly therefrom practically at the junction of the inner jaw 10 and body 9, said projection or stop 12 effectually preventing rearward movement of the roller 7. This indentation producing said interior projection or stop 12 is between the upper and lower edges of the clip extending as will be clear but partially across said clip.

The trace or tug is denoted by 13, and its forward terminal may be of any suitable character, the D 14 being shown for this purpose and being pivoted as by the rivet 15 between the mating jaws 10 and 11 virtually at the high part of the draft of the collar 2. It follows that the D 14 will be sufficiently spaced or separated from the collar to prevent its coming in contact therewith in use, the D being actually held from engaging the collar by the clip.

It will be noted on reference to Fig. 2 that both the inner and outer jaws 10 and 11 of the clip are longitudinally curved. It may not in all cases be necessary that both of them be of this form. As a matter of fact I might obtain the results secured by other means within the scope of the invention, but a clip having a longitudinally curved inner jaw is of considerable advantage, and I find that where they are both curved, the clip can be produced in an inexpensive manner. The curvature of the two jaws of the clip conforms approximately to the draft of the collar, so that it cannot dig into the collar.

What I claim is:

1. In a device of the class described, a clip having a bolt-receiving portion, and inner and outer jaws extending from the bolt-receiving portion, the clip also being inwardly indented at approximately the junction of one of the jaws and the bolt-receiving portion to produce an interior projection, the indentation extending partially across the clip between the upper and lower edges thereof.

2. In a device of the class described, a clip having a bolt-receiving portion, and inner and outer jaws extending from the bolt-receiving portion, the clip being indented inwardly approximately at the junction of one of the jaws and the bolt-receiving portion, said jaws being longitudinally curved, and a D pivoted between the free portions of the jaws, the inner jaw acting positively to prevent the D chafing a collar.

3. In a device of the class described, a clip having a bolt-receiving portion and coöperating jaws extending from the bolt-receiving portion, the jaws being longitudinally curved, and a D member pivoted between the free portions of the jaws, the inner jaw acting positively to prevent the D member from chafing a collar.

4. In a device of the class described, a clip having a bolt-receiving portion and inner and outer longitudinally curved coöperating jaws extending from the bolt-receiving portion, the clip approximately at the junction of the bolt-receiving portion and the inner jaw being indented inwardly between the upper and lower edges of the clip to thereby provide an interior projection, and a D member pivoted between the free portions of the jaws, the inner jaw acting positively to prevent the D member from chafing a collar.

In testimony whereof I affix my signature in presence of two witnesses.

GEORGE W. TROOP.

Witnesses:
L. L. MARKEL,
HEATH SUTHERLAND.